US010327594B2

(12) United States Patent
Ivarsson et al.

(10) Patent No.: US 10,327,594 B2
(45) Date of Patent: Jun. 25, 2019

(54) BLENDER WITH TEMPERATURE SENSOR

(71) Applicant: KONINKLIJKE PHILIPS N.V., Eindhoven (NL)

(72) Inventors: Bengt Ivar Anders Ivarsson, Eindhoven (NL); Maarten Cornelis Jacob De Hoog, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/521,941

(22) PCT Filed: Oct. 8, 2016

(86) PCT No.: PCT/EP2016/074116
§ 371 (c)(1),
(2) Date: Apr. 26, 2017

(87) PCT Pub. No.: WO2017/063962
PCT Pub. Date: Apr. 20, 2017

(65) Prior Publication Data
US 2018/0206677 A1  Jul. 26, 2018

(30) Foreign Application Priority Data

Oct. 12, 2015 (EP) .................................... 15189394

(51) Int. Cl.
*B01F 7/16* (2006.01)
*A47J 27/00* (2006.01)
(Continued)

(52) U.S. Cl.
CPC ......... *A47J 43/0716* (2013.01); *A47J 27/004* (2013.01); *A47J 36/24* (2013.01);
(Continued)

(58) Field of Classification Search
CPC .......... B01F 15/00207; B01F 15/00396; B01F 15/00175; B01F 7/162; B01F 2015/062;
(Continued)

(56) References Cited

U.S. PATENT DOCUMENTS 1,521,031 A * 12/1924 MacFarland .......... A47J 27/004
219/421
2,282,866 A * 5/1942 Hagen ................... A47J 43/046
200/61.58 R
(Continued)

FOREIGN PATENT DOCUMENTS

JP   02121608 A * 5/1990 ............... A47J 27/00
JP   03122992 A * 3/1991 ............... H05B 6/12
(Continued)

OTHER PUBLICATIONS

ProQUEST machine translation of JP 3269708, translatoin made and printed Oct. 2018, 5 pages (Year: 2018).*
(Continued)

*Primary Examiner* — Tony G Soohoo

(57) ABSTRACT

The invention relates to a blender (10) for blending ingredients. The blender (10) comprises a base part (11) comprising a heating plate (22), and a container (13) for receiving said ingredients. The container (13) is detachable from the base part (11) and comprising a bottom part for contacting the heating plate (22). The base part (11) comprises a temperature sensor (23) for sensing the temperature of the bottom part. The temperature sensor (23) extends tends through the heating plate (22).

13 Claims, 14 Drawing Sheets

(51) Int. Cl.
*A47J 36/24* (2006.01)
*A47J 43/07* (2006.01)
*A47J 43/08* (2006.01)
*B01F 15/00* (2006.01)
*B01F 15/06* (2006.01)
*A47J 43/046* (2006.01)

(52) U.S. Cl.
CPC ....... *A47J 43/046* (2013.01); *B01F 15/00175* (2013.01); *B01F 15/00207* (2013.01); *B01F 15/00396* (2013.01); *A47J 36/2483* (2013.01); *A47J 43/085* (2013.01); *B01F 7/162* (2013.01); *B01F 2015/062* (2013.01)

(58) Field of Classification Search
CPC ...... A47J 43/0716; A47J 27/004; A47J 36/24; A47J 43/046; A47J 43/085; A47J 36/2483
See application file for complete search history.

(56) References Cited

U.S. PATENT DOCUMENTS

| | | | | |
|---|---|---|---|---|
| 3,220,450 | A * | 11/1965 | Aronson, II | A47J 43/04 241/199.12 |
| 3,646,321 | A * | 2/1972 | Siegla | F24C 15/102 219/465.1 |
| 3,742,179 | A * | 6/1973 | Harnden, Jr. | H05B 6/062 219/501 |
| 3,786,220 | A * | 1/1974 | Harnden, Jr. | F24C 15/105 219/445.1 |
| 3,825,723 | A * | 7/1974 | Roeser | B01L 1/02 126/369 |
| 4,243,874 | A * | 1/1981 | Fischer | F24C 15/102 219/448.11 |
| 4,286,377 | A * | 9/1981 | Hurko | G01K 7/183 219/448.17 |
| 4,330,701 | A * | 5/1982 | Fischer | F24C 15/105 219/448.15 |
| 4,414,465 | A * | 11/1983 | Newton | F24C 15/105 219/405 |
| 4,702,619 | A * | 10/1987 | Camp | G01K 7/22 116/303 |
| 4,802,407 | A * | 2/1989 | Negri | A01J 25/001 99/453 |
| 4,812,624 | A * | 3/1989 | Kern | F24C 15/105 219/448.14 |
| 4,845,340 | A * | 7/1989 | Goessler | H05B 3/748 219/448.19 |
| 5,296,684 | A * | 3/1994 | Essig | H05B 3/746 219/447.1 |
| 5,428,207 | A * | 6/1995 | Essig | H05B 6/1254 219/622 |
| 5,497,139 | A * | 3/1996 | Takahashi | G01K 7/22 252/519.1 |
| 5,644,284 | A * | 7/1997 | Moriwake | G01K 7/22 252/519.1 |
| 5,877,475 | A * | 3/1999 | Hecht | H05B 3/74 219/448.11 |
| 6,040,562 | A * | 3/2000 | Tokumoto | B23K 3/0353 219/520 |
| 6,164,819 | A * | 12/2000 | Moriwake | G01K 1/12 374/140 |
| 6,283,625 | B2 * | 9/2001 | Frankel | A47J 43/0716 366/146 |
| 6,914,222 | B2 * | 7/2005 | Nakamura | H01L 21/67103 219/444.1 |
| 7,780,337 | B2 * | 8/2010 | Peng | A47J 27/004 366/144 |
| 8,604,103 | B2 | 12/2013 | Hamai | |
| 2001/0003335 | A1 * | 6/2001 | Griffiths | H05B 3/746 219/446.1 |
| 2001/0050005 | A1 * | 12/2001 | Wang | A47J 27/004 99/422 |
| 2002/0117497 | A1 * | 8/2002 | Bassill | H05B 6/062 219/626 |
| 2008/0005630 | A1 | 1/2008 | Adsitt | |
| 2008/0264270 | A1 * | 10/2008 | Peng | A47J 43/0716 99/331 |
| 2009/0304876 | A1 * | 12/2009 | Weiss | A23L 1/1815 426/233 |
| 2012/0223070 | A1 * | 9/2012 | Matsui | H05B 6/1254 219/677 |
| 2013/0112683 | A1 * | 5/2013 | Hegedis | A47J 27/62 219/660 |
| 2015/0101491 | A1 | 4/2015 | Lin | |
| 2016/0014849 | A1 * | 1/2016 | Hegedis | H05B 6/1263 219/627 |
| 2017/0142780 | A1 * | 5/2017 | Hoare | H05B 6/062 |
| 2017/0245327 | A1 * | 8/2017 | Viroli | H05B 6/062 |
| 2017/0343423 | A1 * | 11/2017 | Krzywosz | H01C 1/028 |

FOREIGN PATENT DOCUMENTS

| | | | | |
|---|---|---|---|---|
| JP | 03192684 A | * | 8/1991 | ............ H05B 6/12 |
| JP | 03269708 A | * | 12/1991 | ............ G05D 23/24 |
| JP | 03277318 A | * | 12/1991 | ............ H05B 6/12 |
| JP | 03277319 A | * | 12/1991 | ............ A47J 27/00 |
| JP | 04020308 A | * | 1/1992 | ............ A47J 36/24 |
| JP | 04135518 A | * | 5/1992 | ............ A47J 37/06 |
| JP | 06-231875 A | * | 8/1994 | ............ H05B 6/12 |
| JP | 2008253446 A | | 10/2008 | |
| JP | 2011224288 A | | 11/2011 | |
| JP | 2012009064 A | | 1/2012 | |
| WO | WO 2017063962 A1 | * | 4/2017 | ......... A47J 43/0716 |

OTHER PUBLICATIONS

Capgo.com, Introduction to Thermistors, as archived at Internet Archive—www.web.archive.org: https://web.archive.org/web/20041214173713/http://www.capgo.com/Resources/Temperature/Thermistor/Thermistor.html, 3 pages (Year: 2004).*

* cited by examiner

BLENDER WITH TEMPERATURE SENSOR

This application is the U.S. National Phase application under 35 U.S.C. § 371 of International Application No. PCT/EP2016/074116, filed on Oct. 8, 2016, which claims the benefit of International Application No. 15189394.8 filed on Oct. 12, 2015. These applications are hereby incorporated by reference herein.

FIELD OF THE INVENTION

The invention relates to a blender for blending ingredients.

The invention may be used in the field of food blending, in particular kitchen appliance blenders.

BACKGROUND OF THE INVENTION

Blenders are kitchen appliances designed for mixing or blending food ingredients such as fruits, milk and ice, into liquids. Blenders typically consist of a base, having a vertically positioned powerful a/c motor with a first coupling, and a cylindrical jar located directly above the base. The jar has a rotatable blade assembly at the bottom with a second coupling driven by the first coupling.

Blenders comprising means for heating the ingredients in the jar are known. A first version of this type of blenders comprises a jar made of metal, a heating element integrated in the jar and an electrical connection between the base and the jar for powering the heating element. Another, less common version of this type of blenders includes a jar made of glass material and a heating element disposed in the base. The heating element heats a bottom part of the jar by heat conduction, and therefore no electrical connection is provided between the jar and the base. This latter type of blenders has the advantage of providing a full transparency of the jar and a sense of quality to the user, and also allows the jar to be machine-washable since the jar does not have any electrical connection.

In order to achieve an effective cooking of the food ingredients, without undercooking, overcooking, overflowing or dry-boiling, it is useful to provide a temperature sensor in the blender to measure the temperature in the jar and provide a temperature feedback to the base. One problem with measuring the temperature in the jar is that the temperature sensor cannot be directly in contact with the food ingredients. One solution is to sense the temperature through the glass wall of the jar or on an extended lip coming out from a blade holding component of the jar. However, this solution gives a reading of the temperature in the jar that is delayed and therefore not accurate.

US2008/0264270 discloses a baby food maker comprising a jar having an open top and an open bottom for holding food. A top cap is provided for closing the open top of the jar and a bottom cap sealingly engages with the lower end of said jar for forming a cooking chamber. A blending means is installed inside the cooking chamber for blending food and a heating tube is fixedly installed on the bottom of the bottom cap for heating food.

US2015/0101491 discloses a soup maker comprising a container mounted to an annular seat receiving a heat conducting pan that receives food to be cut by a cutter. A heating pan abuts a bottom of the thermally conducting pan and is connected to a heating tube which is electrically connected to a power supply terminal. A temperature sensor abuts the heating pan. The soup maker comprises a base including a coupling portion having a terminal hole and a sensor hole.

US2008/0035630 discloses a cooking device comprising a coupling housing having a detachable vessel with a detachable pulverising blade, a sensor and a plate type of a heater on which a plurality of heat bands are installed to adjust the calorific value. A base is coupled to the lower part of the coupling housing.

OBJECT AND SUMMARY OF THE INVENTION

It is an object of the invention to propose a blender that avoids or mitigates one or more of above-mentioned problems.

The invention is defined by the independent claims. The dependent claims define advantageous embodiments.

To this end, the blender for blending ingredients according to the invention comprises:
 a base part comprising a heating plate,
 a container for receiving the ingredients, the container being detachable from the base part and comprising a bottom part for contacting the heating plate,
 the base part comprising a temperature sensor for sensing the temperature of the bottom part, the temperature sensor extending through the heating plate.

When the base part and the container are attached, the heating plate and the bottom part are in contact with each other, making heat conduction possible from the heating plate to the bottom part and therefore to the ingredients in the container. The position of the temperature sensor through the heating plate is such that an accurate sensing of the temperature of the bottom part is enabled. The blender therefore helps preventing undercooking, overcooking, overflowing or dry-boiling and allows for an effective cooking of the ingredients.

Preferably, when the container is attached to the base part and the heating plate is in contact with the bottom part, the temperature sensor is in contact with the bottom part. This further helps providing an accurate measurement of the temperature of the bottom part.

Advantageously, the heating plate comprises a heating element, the temperature sensor extending through the heating plate in an area where the heating element does not extend. This advantageously ensures that the heating element does not disrupt the measurement of the temperature of the bottom plate, whilst ensuring that the base part, in which the heating plate, the heating element and the temperature sensor are arranged, remains compact.

Preferably, the heating element is arch-shaped and comprises a first electrical connection and a second electrical connection, the temperature sensor being arranged in-between the first electrical connection and the second electrical connection. This further advantageously ensures that the base remains compact.

Advantageously, the temperature sensor comprises a thermistor. This advantageously allows for a precise measurement of the temperature of the bottom part.

Preferably, the temperature sensor comprises a cap encapsulating the thermistor. Advantageously, the cap is made of a high temperature resistant material. The cap is therefore configured to withstand high temperatures and does not deteriorate when the heating plate is at a high temperature.

Preferably, the cap is cylindrical-shaped. This advantageously ensures the cap fits the shape of the temperature sensor and also fits through the heating plate.

Preferably, the cap has a diameter in the range [5 mm; 20 mm].

Advantageously, the heating plate comprises an aperture for receiving the cap.

Preferably, the heating plate and the cap are dimensioned to create an air gap in-between. The air-gap advantageously helps ensuring that heat conduction from the heating element directly towards the temperature sensor is limited. The air-gap advantageously helps ensuring that the heat coming from the bottom part towards the temperature sensor is predominant over the heat coming from the heating element, and that the temperature sensor is therefore responsive to the heat coming from the bottom part rather than to the heat coming from the heating element. This allows the temperature sensor to properly detect the temperature in the container without being disrupted by the heat coming from the heating element.

Advantageously, an insulating member is provided in the air-gap. This advantageously further helps limiting heat conduction from the heating element directly to the temperature sensor.

Advantageously, the cap is movable along a vertical direction relative to the heating plate, the cap comprising a flat top part, the cap being adapted to take a first position when the bottom part does not contact with the heating plate, and a second position when the bottom part contacts with the heating plate, the flat top part coming out by a given distance from an external surface of the heating plate in the first position, the flat top part being aligned with the external surface in the second position. This advantageously ensures that the capped temperature sensor touches the bottom part when the container is placed on the base part.

Preferably, the given distance is in the range [1 mm; 10 mm].

Advantageously, the cap is biased toward the first position. This advantageously further ensures that the capped temperature sensor is in contact with the bottom part when the container is placed on the base part.

Preferably, the thermistor is in contact with the flat top part. This advantageously improves the accuracy of the temperature sensing.

Advantageously, the thermistor is a Negative Temperature Coefficient thermistor.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1A:
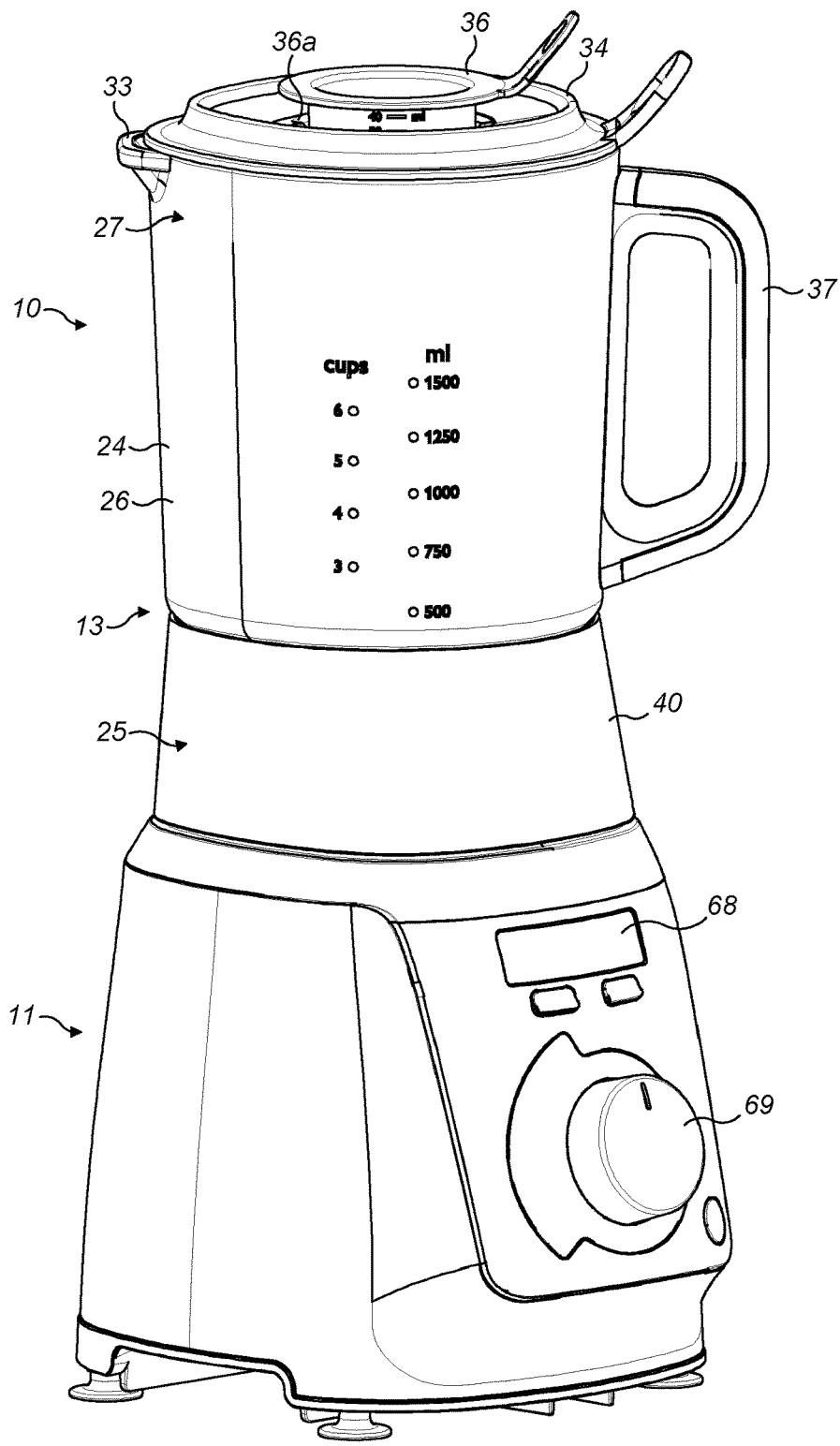
FIG. 1A depicts a perspective view of a blender according to the invention.

Referring to FIG. 1A to FIG. 1D, a blender 10 for blending food ingredients in accordance with the invention is shown. The blender 10 described herein is for example a programmable cooking blender.

Throughout the description, terms such as 'upwards', 'downwards', 'horizontal', 'vertical', 'bottom", 'top', 'upper', 'lower' and so on relate to the orientation of the blender 10 as shown in FIG. 1 of the accompanying drawings.

The blender 10 comprises:
a base part 11 comprising a heating assembly 12,
a container 13 for receiving the ingredients, the container 13 comprising a bottom part 14 being manually detachable, the bottom part 14 comprising:
  a bottom plate 15 for contacting the heating assembly 12,
  a blade assembly 16 extending through the bottom plate 15, the blade assembly 16 having a first end 17 extending in the container 13 and comprising at least one blade 18, and a second end 19 facing the base part 11 and comprising a coupling element 20 to receive a rotation force from the base part 11,
  a grip element 21 surrounding the bottom plate 15 for manually gripping and detaching the bottom part 14, the grip element 21 extending downwards at least partly along the coupling element 20.

The heating assembly 12 has a heating plate 22 for transferring heat by conduction to the detachable bottom part 14. The base part 11 comprises a temperature sensor 23 for sensing the temperature of the bottom part 14 of the container 13, the temperature sensor 23 extending through the heating plate 22.

The container 13, or jar assembly 13, is configured to be secured to the base part 11. Preferably, the jar assembly 13 comprises a jar 24 and a collar assembly 25 or skirt 25. The jar 24 is generally cylindrical. The jar 24 has a sidewall 26 and comprises an upper region 27 and lower region 28, or lower neck 28. The diameter of the lower region 28 is less that the diameter of the upper region 27. The upper region 27 comprises an upper opening 29 through which food ingredients to be blended, for example ingredients for a soup, can be introduced in the jar 24. The lower region 28 comprises a lower opening 30 that is closed by the detachable bottom part 14. The lower region 28 has a lower end 31 including a jar sealing surface 32. A spout 33 is arranged at an end of the sidewall 26 in the upper region 27. A lid 34 along with a lid seal 35 are provided for sealingly closing the upper opening 29. A measuring cup 36 may be provided in a recess 36a in the lid 34. A handle 37 may be attached to the sidewall 26 of the jar 24. The jar 24 is advantageously made of transparent glass so that the user can see the ingredients in the jar 24 during use.

Figure 2A:
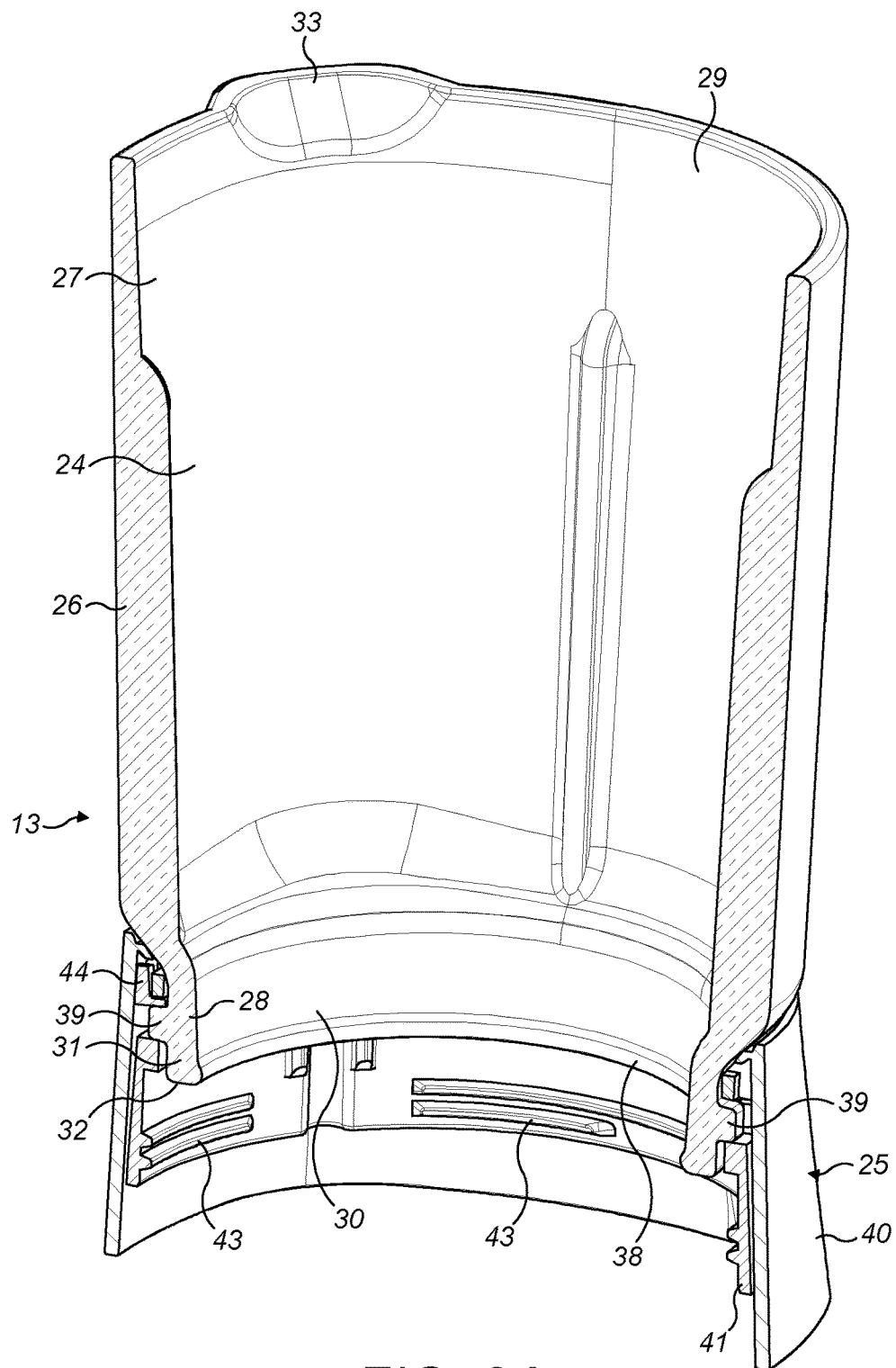
FIG. 2A depicts a cross-sectional perspective view of a jar and collar assembly of a blender according to the invention.

As shown in FIG. 2A, an internal retaining rib 38 may extend circumferentially from the sidewall 26 in the lower region 28, towards the centre of the jar 24. Alternatively, a plurality of internal retaining ribs (not shown) extend along the circumference of the sidewall 26 in the lower region 28 towards the centre of the jar 24. A plurality of external locating ribs 39, for example four external locating ribs 39, may be distributed around the circumference of the jar 24. The external locating ribs 39 project outwards from the sidewall 26. The external locating ribs 39 may be secured to the collar assembly 25.

The collar assembly 25 is arranged around the lower region 28 and is configured to receive the bottom part 14. The collar assembly 25 is secured to the lower region 28. Advantageously, the collar assembly 25 comprises a first, inner collar 41 and a second, outer collar 40. The inner collar 41 and the outer collar 40 are assembled together by means of a plurality of screws 42. The outer collar 40 may surround the inner collar 41 such that the outer collar 40 and the inner collar 41 are concentric. The external locating ribs 39 may be sandwiched or secured between the inner collar 41 and the outer collar 40 so that the collar assembly 25 is fixedly attached to the lower region 28. The outer collar 40 may extend circumferentially around the lower region 28 and may extend downwards beyond the lower region 28. Similarly, the inner collar 41 may extend circumferentially around the lower region 28 and may extend downwards beyond the lower region 28. The outer collar 40 may extend downwards beyond the inner collar 41 so that when the jar assembly 13 is placed on a surface such as a table, the jar assembly 13 rests on the outer collar 40. The inner collar 41 comprises an inner thread 43. The outer collar 40 and the inner collar 41 are advantageously made of plastic material.

Figure 2B:
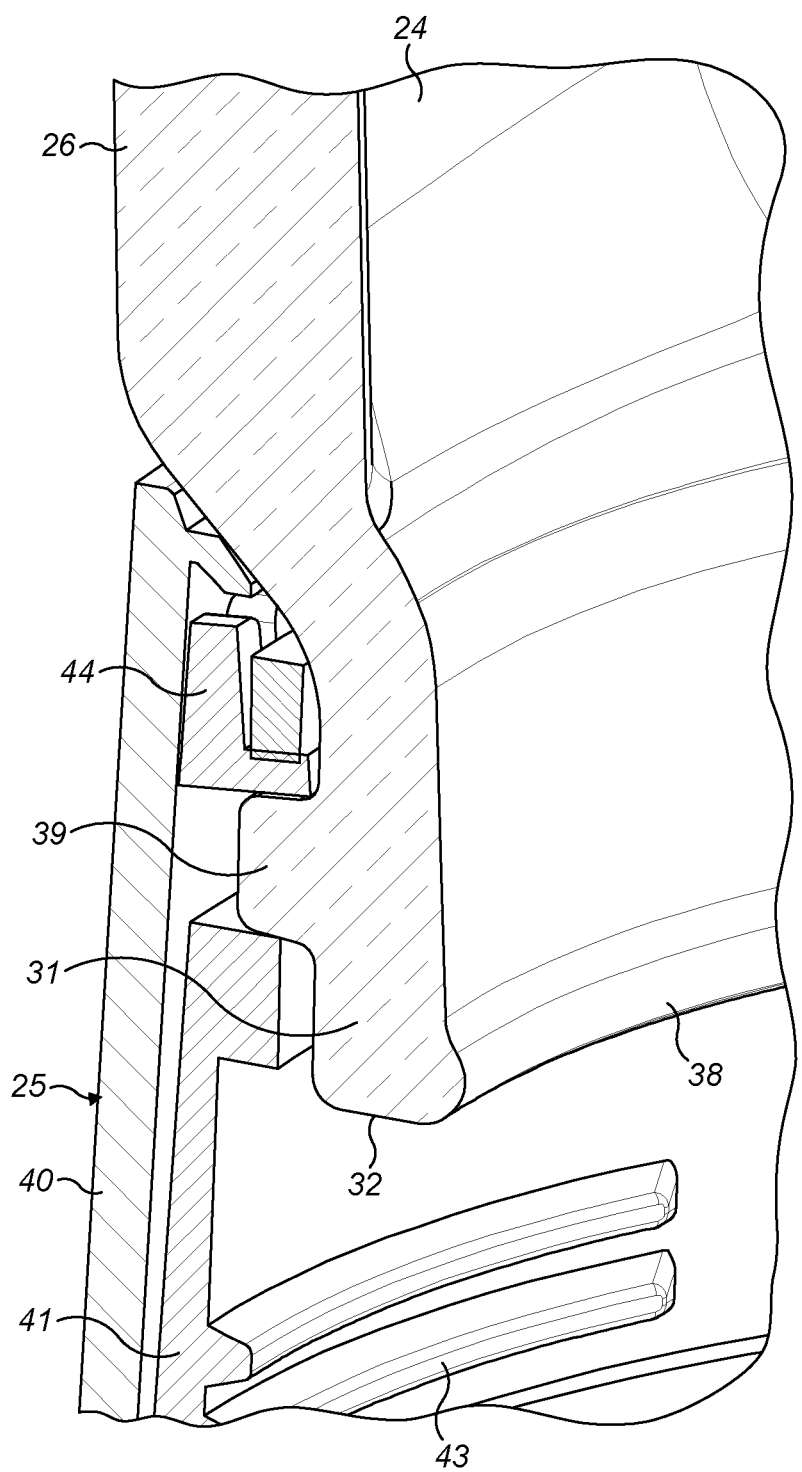
FIG. 2B depicts a detail of a jar and collar assembly as shown in FIG. 2A.

As visible in FIG. 2A and FIG. 2B, a pad 44 may be disposed between the outer collar 40 and the sidewall 26 in the lower region 28. The pad 44 extends circumferentially around the lower region 28 between the outer collar 40 and the sidewall 26. The pad 44 is advantageously made of rubber. The pad 44 helps preventing damage of the outer collar 40 during lifetime of the blender 10.

Figure 3:
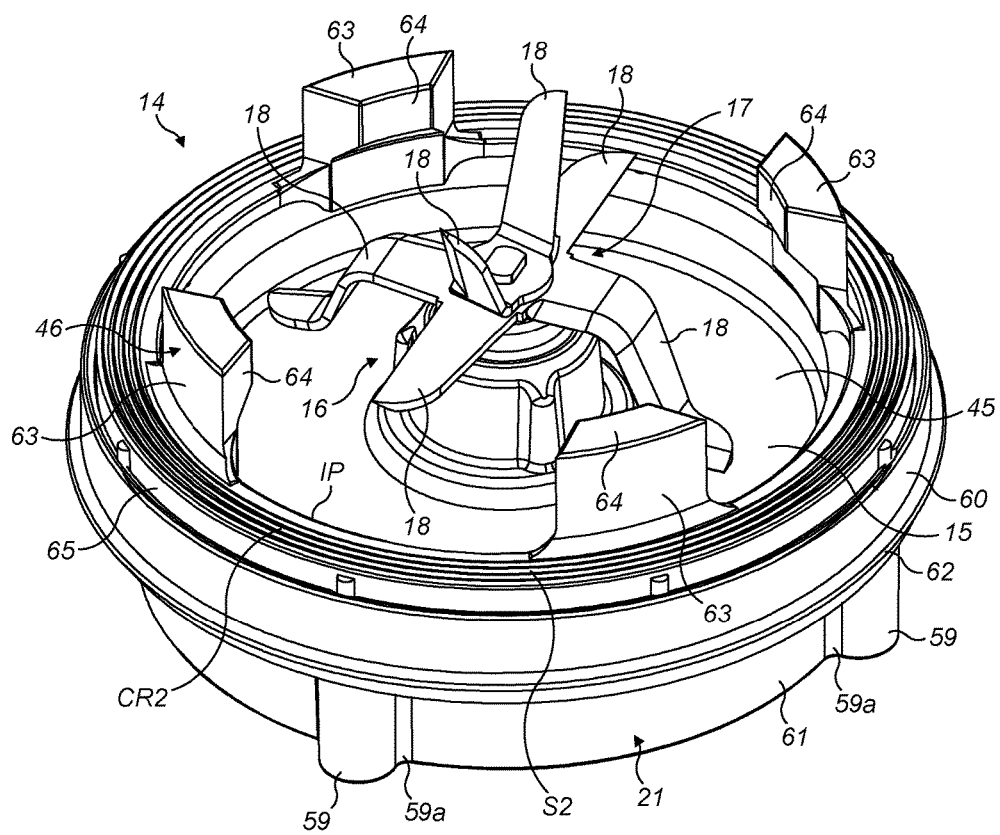
FIG. 3 depicts a perspective view of a detachable bottom part of a blender according to the invention.
Figure 4:
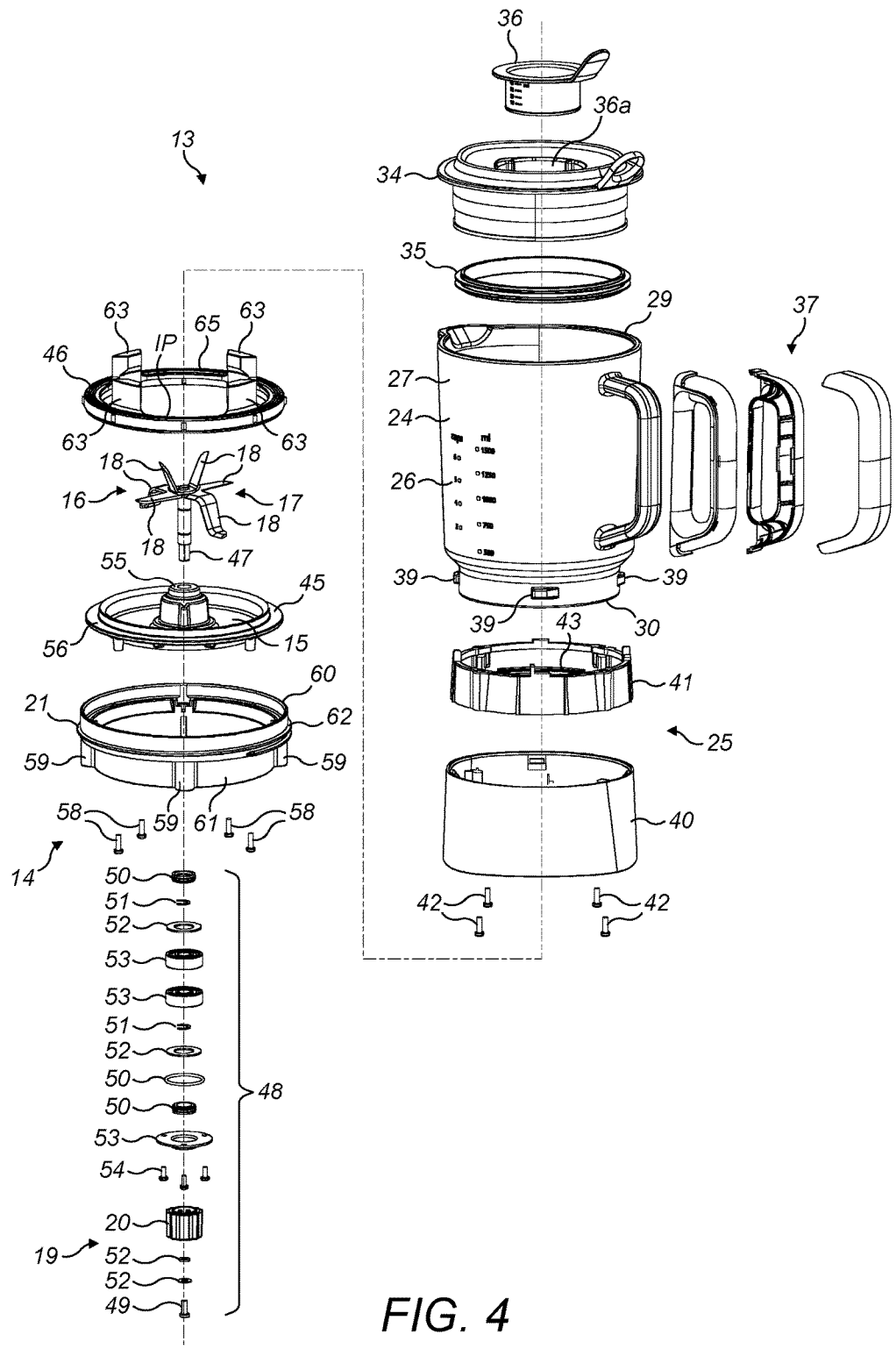
FIG. 4 depicts a three-dimensional exploded view of a container of a blender according to the invention.
Figure 5:
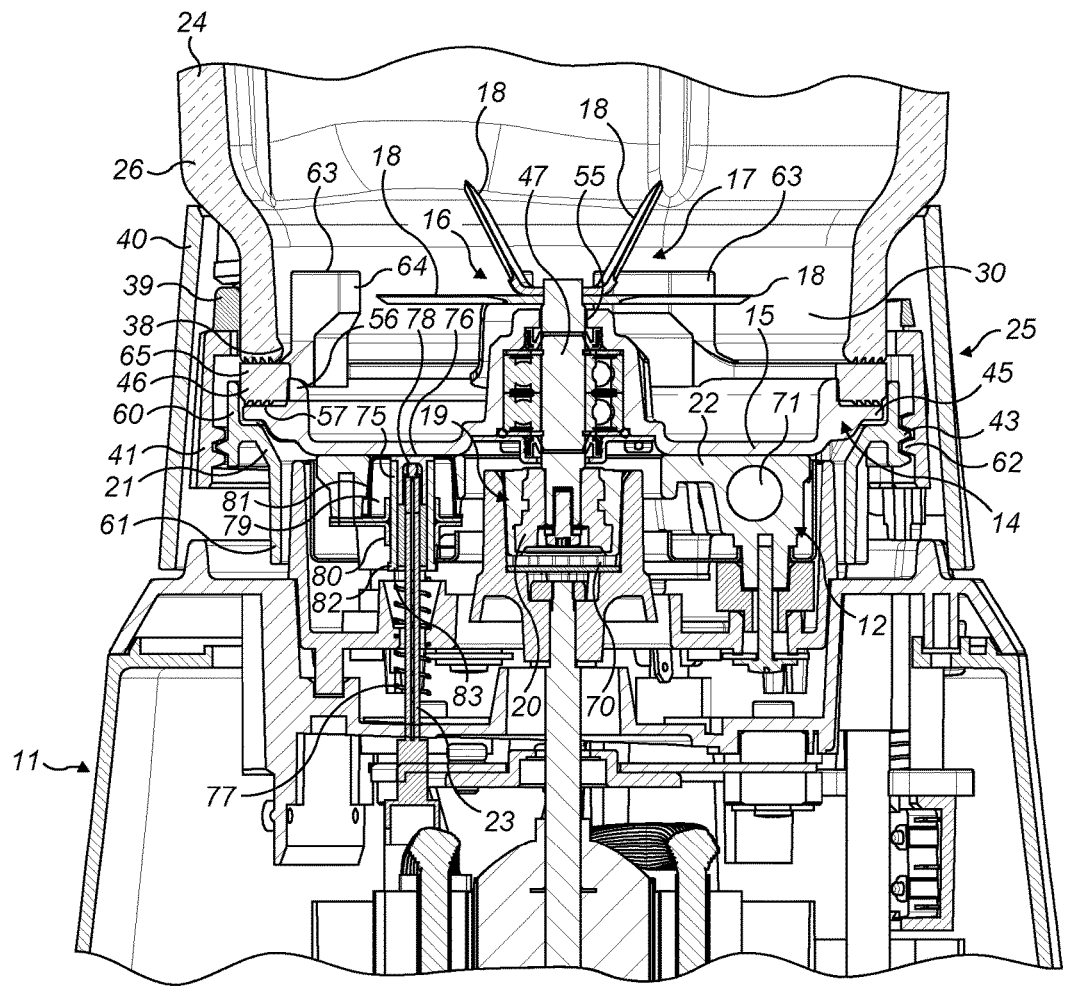
FIG. 5 depicts a vertical cross-sectional view of a part of a blender according to the invention.

The detachable bottom part 14 is illustrated in FIG. 3 to FIG. 5. The bottom part 14 is intended to close the lower opening 30 of the jar 24. The bottom part 14 comprises the blade assembly 16, a blade holder 45, the grip element 21 allowing the user to detach the bottom part 14, and a sealing element 46 or sealing gasket 46 for sealing the lower opening 30 of the jar 24.

The first, upper end 17 of the blade assembly 16 extends in the jar 24 and comprises a plurality of blades 18. The plurality of blades 18 are mounted on a shaft 47. The second, lower end 19 of the blade assembly 16 faces the base part 11 and comprises a coupling assembly 48 including the coupling element 20. The coupling element 20 is secured to the shaft 47 by means of a coupling nut 49 or coupling screw 49. As shown in FIG. 4, a plurality of O-rings 50, C-rings 51, washers 52 and bearing elements 53 with screws 54 are also provided in the coupling assembly 48 to ensure a good connection between the coupling element 20 and the blade assembly 16. The coupling element 20 is preferably circular and has for example an outer diameter of approximately 29 millimeters.

The blade holder 45 is configured to position the blade assembly 16 relative to the jar 24. The blade holder 45 is configured to maintain the shaft 47 substantially parallel to the sidewall 26 of the jar 24. The blade holder 45 has a generally circular shape. The blade holder 45 comprises the bottom plate 15 configured to contact with the heating plate 22 in the base part 11 when the jar assembly 13 is arranged on the base part 11. The bottom plate 15 is generally flat. The bottom plate 15 is generally circular. The blade holder 45 comprises a central passage 55 through which the shaft 47 extends. The central passage 55 is generally circular. Preferably, the blade holder 45 comprises a circumferential wall 56 projecting upwards. The circumferential wall 56 may be substantially vertical. Preferably, the blade holder sealing surface 57 extends from an outer edge of the circumferential wall 56. The blade holder sealing surface 57 is substantially perpendicular to the circumferential wall 56 and faces upwards. The blade holder sealing surface 57 extends circumferentially around the wall 56. The blade holder 45 is advantageously made of die-cast aluminium to effectively conduct heat from the heating plate 22 to the food ingredients inside the jar 24. The flat bottom plate 15 is preferably machined by Computer Numerical Control (CNC) machining Optionally, the blade holder 45 is coated with a thermoplastic material such as Teflon or any other coating allowing the blade holder 45 to be machine-washable.

The grip element 21 is attached to the blade holder 45. For example, as depicted in FIG. 4, the grip element 21 and the blade holder 45 are assembled by plurality of screws 58, for example four screws 58. Optionally, the grip element 21 has a plurality of protuberances 59, for example four protuberances 59, coinciding with holes (not shown) in the grip element 21 that receive the screws 58 for assembling the grip element 21 and the blade holder 45. The protuberances 59 allow for an easy gripping of the grip element 21 by the user.

Advantageously, the grip element 21 is in the form of a grip ring 21 having an upper wall 60 and a lower wall 61. The grip ring 21 forms a protecting sleeve around the blade holder 45. Specifically, the grip ring 21 forms a circular ribbon or perimeter wall around the flat bottom plate 15. In one embodiment, the lower wall 61 extends beyond the coupling element 20 so that the bottom plate 15 is protected and prevented from being scratched or deteriorated, which would be detrimental to the heat transfer from the heating plate 22. The lower wall 61 of the grip ring 21 therefore improves the durability of the bottom part 14 and therefore the durability of the blender 10. The upper wall 60 of the grip ring 21 extends upwards around the sealing gasket 46 such that the grip element 21 holds the sealing gasket 46 when the bottom part 14 is detached.

Optionally, the grip ring 21 comprises at least one external nail-shaped element 59a or external finger grip 59a for allowing the user to firmly hold the grip element 21 when detaching the bottom part 14. Optionally, the grip element 21 comprises a plurality of external finger grips 59a formed by the protuberances 59 distributed on the lower wall 61.

The grip ring 21 is advantageously manually threaded to the inner collar 41. To this end, an outer thread 62 is formed in the upper wall 60. The outer thread 62 is adapted to cooperate with the inner thread 43 of the inner collar 41 to attach the bottom part 14 to the collar assembly 25. Advantageously, the grip element 21 is made of plastic material. As both the inner collar 41 and the grip ring 21 are advantageously made of plastic material, both the inner collar 41 and the grip ring 21 have resiliency properties that ensure a good fit between the grip ring 21 and the inner collar 41. Therefore, an enhanced connection between the grip ring 21 and the inner collar 41 is enabled. The simple connection between the grip ring 21 and the collar assembly 25 limits the number of parts needed by the user to assemble the jar assembly 13. This facilitates the use of the blender 10. As the bottom part 14 is easily detachable, the jar 24 and the blades 18 are also more easily cleanable.

Advantageously, the grip ring 21 is made of a high-temperature resistant material so that the grip ring 21 can withstand high temperatures and therefore does not deteriorate when the bottom plate 15 is heated. Preferably, the grip ring 21 is made of a thermal insulating material, so that the user does not burn themselves when detaching the bottom part 14 in case the jar assembly 13 has just been removed from the hot heating plate 22 and the temperature of the bottom plate 15 is still high. The grip ring 21 therefore helps avoiding the user to be burnt and helps improving the safety of the blender 10.

The sealing element 46 or sealing gasket 46 is arranged between the blade holder 45 and the jar 24. One function of the sealing gasket 46 is to ensure the sealing between the detachable bottom part 14 and the jar 24 to prevent food ingredients and liquid in the jar 24 from leaking outside the jar 24.

Preferably, the sealing gasket 46 comprises at least one friction rib 63 extending upwards inside the jar 24. The friction rib(s) 63 aims to create turbulences among the food ingredients during blending, to improve the blending performance. The friction rib(s) 63 replaces the ribs made of glass and moulded together with the jar 24 of known blenders. Preferably, as illustrated in FIG. 5, the at least one friction rib 63 extends along an internal surface of the sidewall 26 in the lower region 28 of the jar 24. Preferably, the at least one friction rib 63 comprises a plurality of friction ribs 63 distributed around an inner periphery IP of the sealing gasket 46. For example, as illustrated in FIG. 3, a number of four friction ribs 63 is chosen. Advantageously, the friction ribs 63 are regularly distributed around the inner periphery IP. For example, if a number of four friction ribs 63 is chosen, the friction ribs 63 are distributed every 90 degrees around the inner periphery IP.

Figure 6:
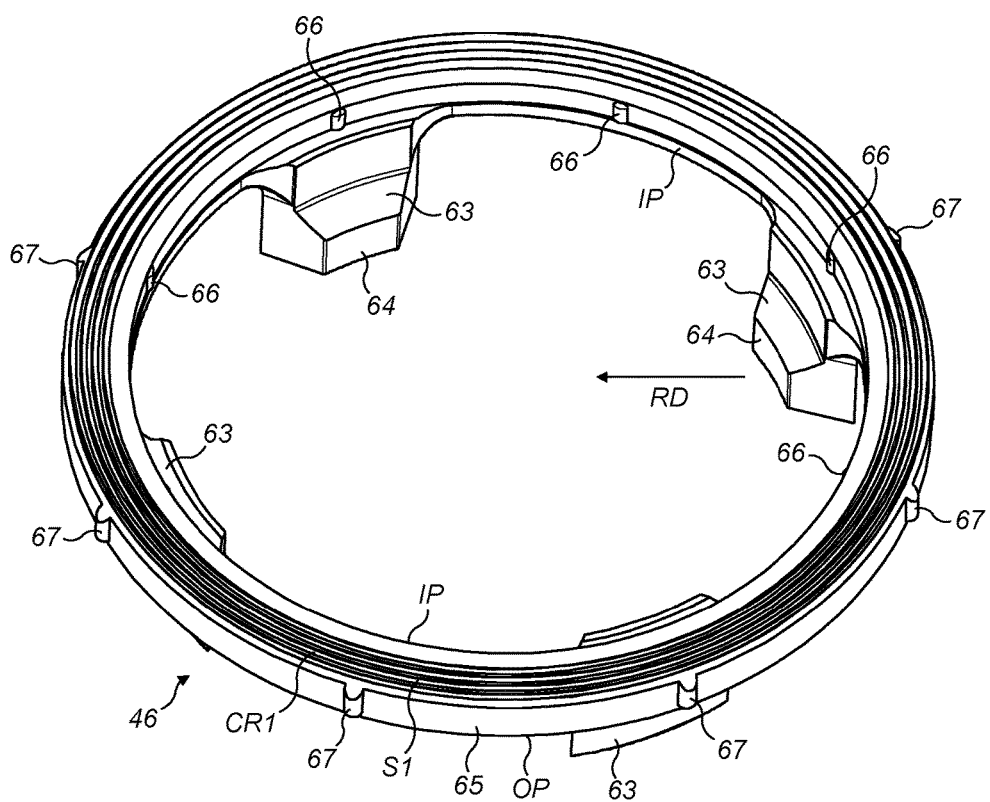
FIG. 6 depicts a perspective bottom view of a sealing element of a blender according to the invention.
Figure 7A:
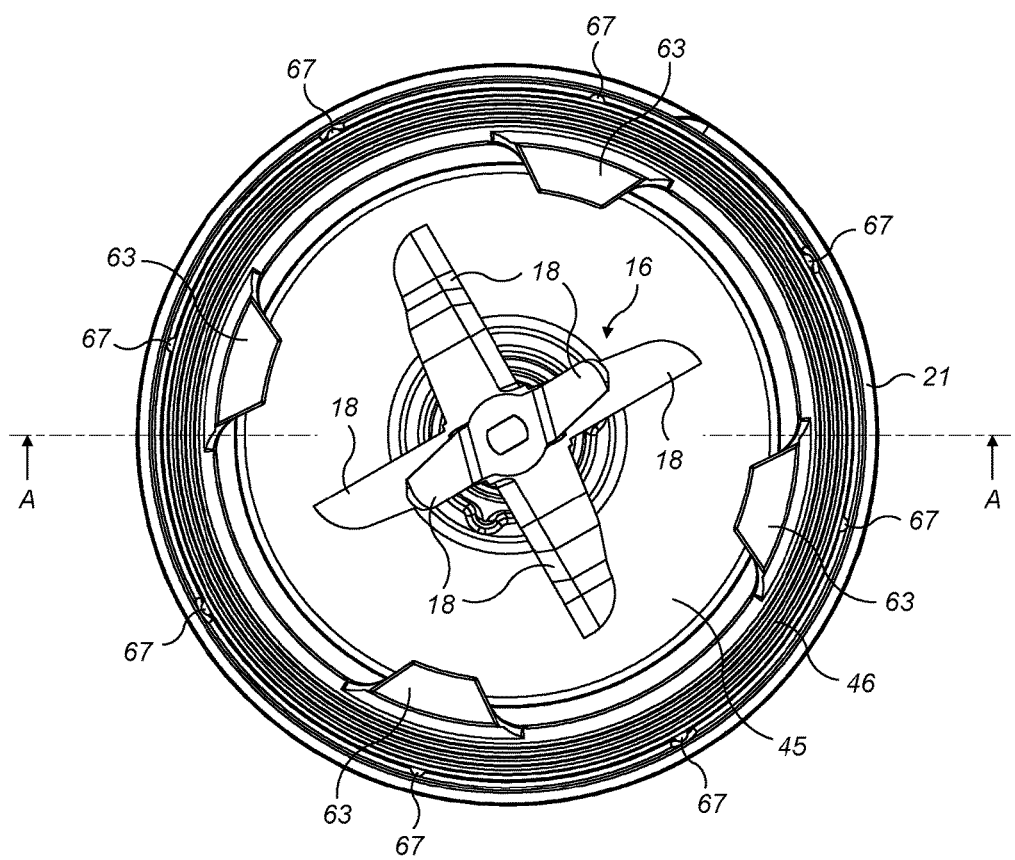
FIG. 7A depicts a top view of a removable bottom part and heating assembly of a blender according to the invention.
Figure 7B:
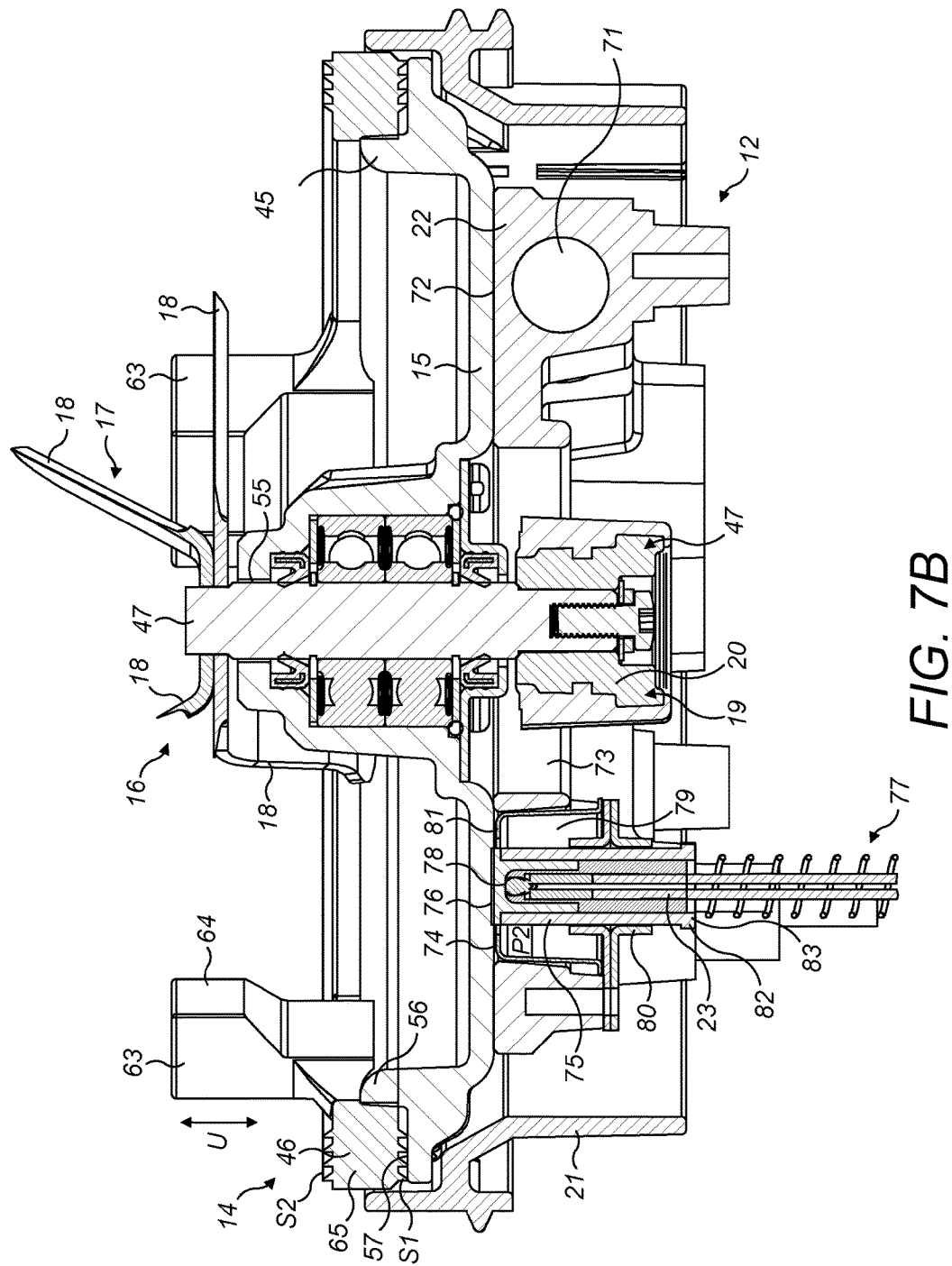
FIG. 7B depicts a vertical cross-sectional view of a removable bottom part and heating assembly of a blender according to the invention, taken along the line A-A shown in FIG. 7A, and FIG. 8A, FIG. 8B, FIG. 9A, FIG. 9B depict various views of a heating assembly of a blender according to the invention.

Preferably, at least one of the friction ribs 63 comprises a tab portion 64 extending along a direction RD (represented in FIG. 6) being radial compared to an inner periphery IP of the sealing gasket 46. The direction RD directs toward the centre of the inner periphery IP. Preferably, the tab portion 64 is arranged at an upper part U (represented in FIG. 7B) of the at least one friction rib 63. For example, as depicted by FIG. 3 and FIG. 7B, the tab portion 64 is at the most upper part of the friction rib 63. Optionally, the tab portion 64 t the form of a truncated pyramid.

Preferably, as depicted in FIG. 4, the sealing gasket 46 comprises a ring element 65 having a first surface S1 facing the blade holder 45 and a second surface S2 facing the jar 24. At least one of the first surface S1 and the second surface S2 comprises concentric compression ribs CR1, CR2. For example, as depicted in FIG. 3, FIG. 4 and FIG. 6, the compression ribs CR1 are on the first surface S1 and the compression ribs CR2 are on the second surface S2. The compression ribs CR1, CR2 aim to further improving the contact with the lower region 28 of the jar 24.

Preferably, the sealing gasket 46 and the at least one friction rib 63 form a single element made of moulded rubber material. Alternatively, the at least one friction rib 63 is glued or attached as separate elements, and are for example made of plastic material.

Preferably, as depicted in FIG. 6, the inner periphery IP is provided with a plurality of inner retention ribs 66 distributed circumferentially around the circumference of the sealing gasket 46. Similarly, an outer periphery OP of the sealing gasket 46 may be provided with a plurality of outer retention ribs 67 distributed circumferentially around the ring element 65. The plurality of inner and outer retention ribs 66, 67 help improving the retention of the sealing gasket 46 between the circumferential wall 56 of the blade holder 45 and the upper wall 60 of the grip ring 21.

Advantageously, the sealing gasket 46 is supported by the blade holder 45. Preferably, the sealing gasket 46 is maintained tight between the upper wall 60 of the grip ring 21 and the circumferential wall 56 of the blade holder 45. In this way, the sealing gasket 46 does not fall down when the user detaches the bottom part 14. When the inner thread 43 is engaged with the outer thread 62, the sealing gasket 46 is tightly held in place between the blade holder sealing surface 57 and the jar sealing surface 32, and also abuts against the internal retaining rib 38 of the jar 24. This helps ensuring a good sealing of the lower opening 30 of the jar 24.

An accurate location and compression of the sealing gasket 46 is enabled since the connection between the detachable bottom part 14 and the jar assembly 13 does not rely on the poor tolerance of the glass jar 24. The blender 10 therefore provides a reliable sealing between the detachable bottom part 14 and the jar assembly 13. In addition, since the inner collar 41 and the grip element 21 are both advantageously in plastic material, friction between the inner thread 43 and the outer thread 62 is reduced and an easy attachment/removal of the bottom part 14 is enabled. Furthermore, since the heat transfer occurs by heat conduction from the heating plate 22 in the base part 11 to the bottom plate 15 in the jar assembly 13, the jar assembly 13 does not need any electrical connection. This increases safety for the user and allows the jar assembly 13 to be machine-washable.

Figure 1B:
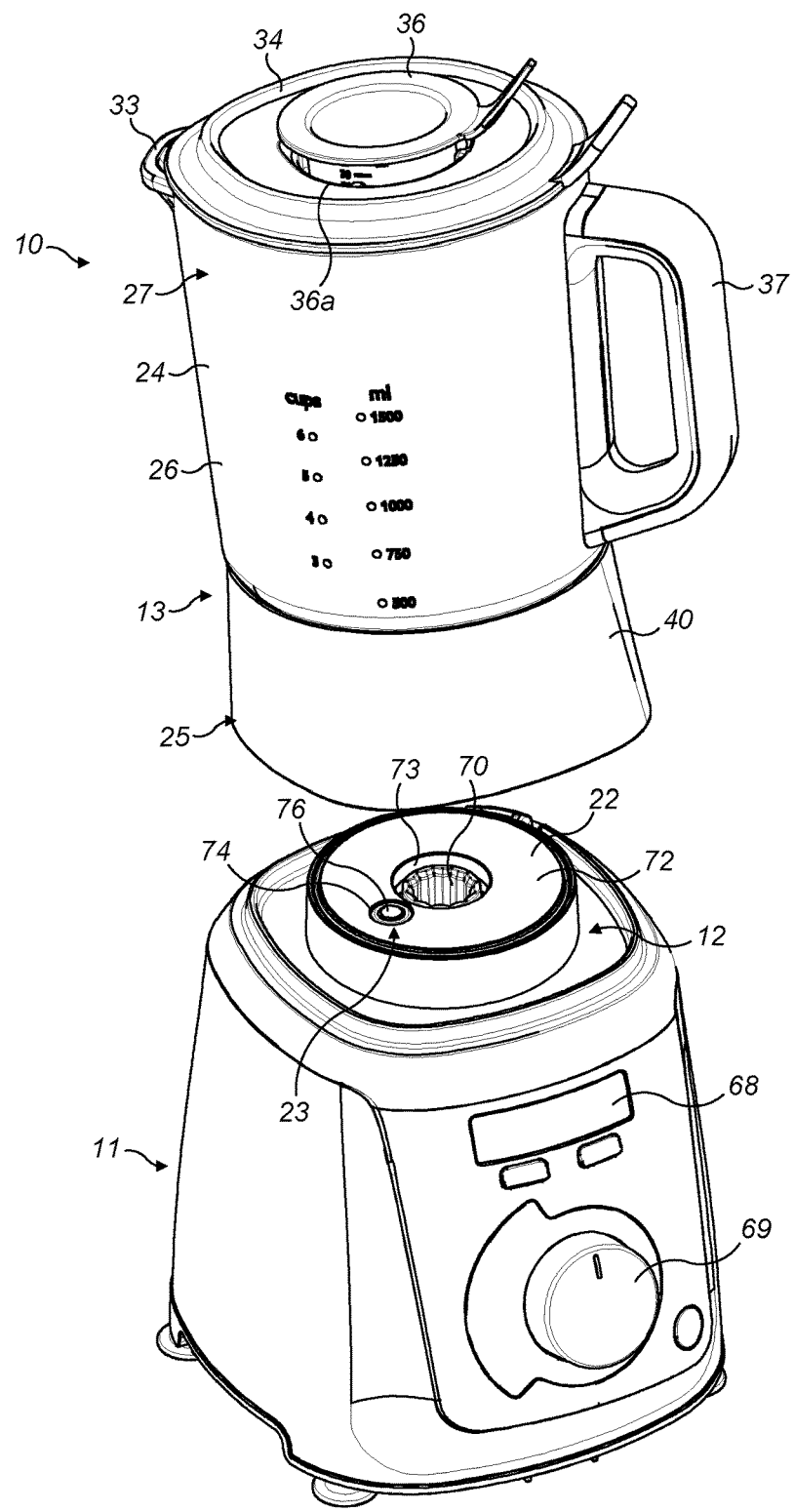
FIG. 1B depicts a perspective view of a blender as depicted in FIG. 1, the container being removed from the base part.
Figure 1C:
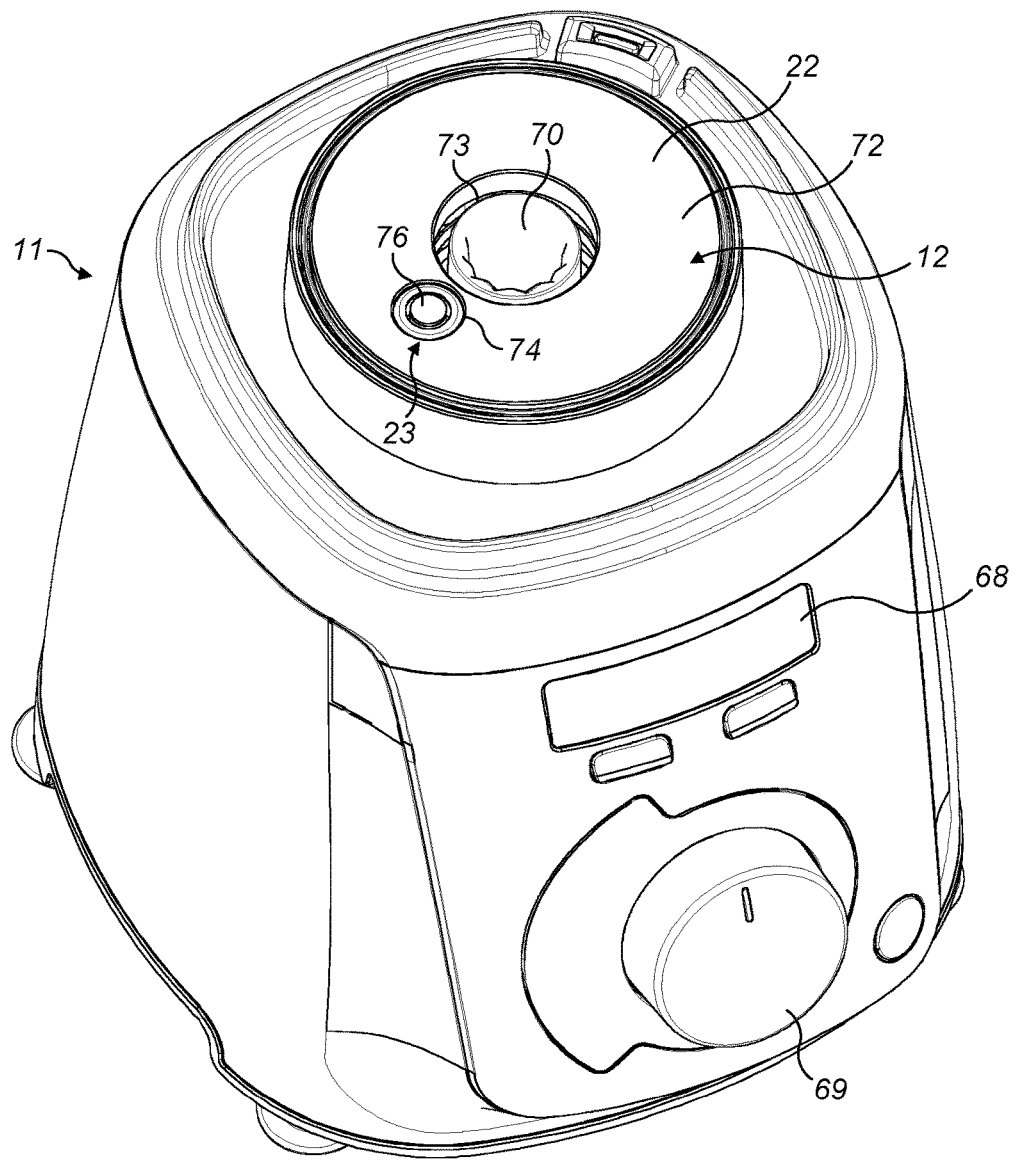
FIG. 1C depicts a perspective view of a base part of a blender as depicted in FIG. 1.
Figure 1D:
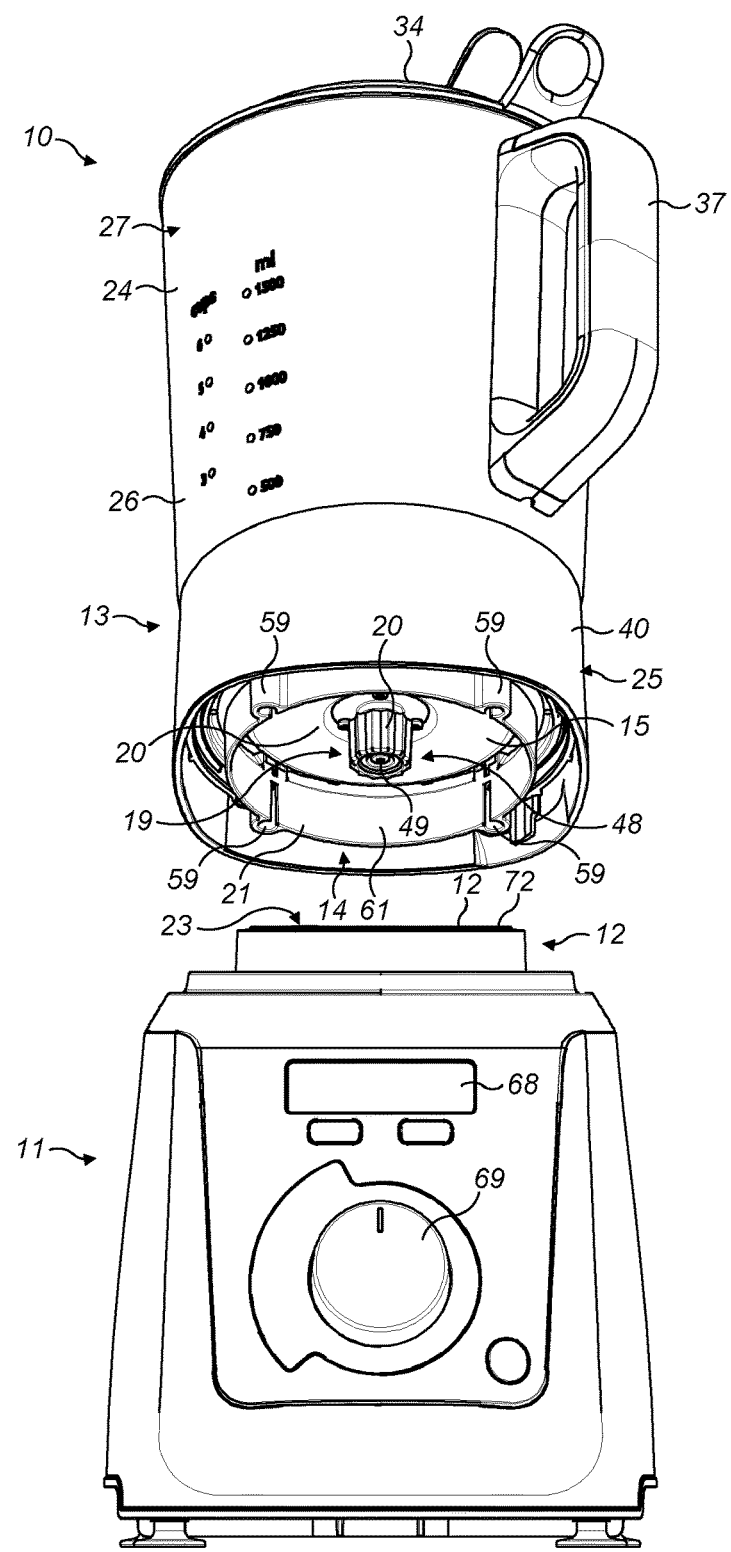
FIG. 1D depicts a further perspective view of a blender as depicted in FIG. 1, where in particular the removable bottom part of the container is visible.

As shown in FIG. 1B and FIG. 1C, the base part 11 may comprise a display screen 68 and a control button 69 enabling the user to make a selection among a plurality of cooking programs. The base part 11 comprises the heating assembly 12 for heating the ingredients in the jar 24, and a gearing system 70 configured to couple with the coupling element 20 to drive the blade assembly 16 in rotation in the jar 24. The base part 11 further comprises a microcontroller (not shown) for controlling the gearing system 70 and the heating assembly 12.

The heating assembly 12 is illustrated in more detail in FIG. 8A to FIG. 9B. The heating assembly 12 includes the heating plate 22 and a heating element 71 extending within the heating plate 22.

The heating plate 22 has an external heating surface 72 facing upwards. The heating plate 22 is generally circular and has a diameter that is less than the diameter of the grip element 21. Advantageously, the diameter of the heating plate 22 corresponds substantially to the diameter of the bottom plate 15. The heating plate 22 is preferably made of die-cast aluminium.

Preferably, the heating plate 22 is provided with a central aperture 73. The central aperture 73 is configured to receive the coupling element 20 when the jar assembly 13 is secured to the base part 11. The central aperture 73 is preferably circular and has a diameter in the range [22 mm; 50 mm], for example a diameter of approximately 36 millimeters. When the base part 11 and the jar assembly 13 are assembled, the external heating surface 72 and the bottom plate 15 are in contact with each other, making heat conduction possible from the heating plate 22 to the bottom part 14 of the jar 24 and therefore to the food ingredients in the jar 24.

Advantageously, the heating plate 22 further comprises an additional aperture 74. The additional aperture 74 is preferably round-shaped. The additional aperture 74 is preferably smaller than the central aperture 73. The additional aperture 74 has a diameter in the range [6 mm; 30 mm], for example a diameter of approximately 10 millimeters. The additional aperture 74 extends through the heating plate 22 between the central aperture 73 and the circumference of the heating plate 22. Preferably, the additional aperture 74 is located in the heating plate 22 substantially halfway between the centre of the heating plate 22 and a point situated in the circumference of the heating plate 22.

The heating element 71 is preferably cast into the heating plate 22. The heating element 71 is for example in the form of a copper tube receiving a thin coil-shaped copper wire (not shown) and filled with magnesium oxide surrounding the copper wire. In operation, an electrical current runs through the copper wire. Due to the resistance of the copper wire, heat is generated and transferred outwards to the heating plate 22 surrounding the copper tube. The heating element 71 is arch-shaped and extends concentrically with the circular heating plate 22. The heating element 71 comprises a first electrical connection C1 in the form of a first end point or first cold pin, and a second electrical connection C2 in the form of a second end point or second cold pin. The first and second electrical connections C1, C2 extend substantially vertically downwards below the heating plate 22. The additional aperture 74 is located in the heating plate 22 between the first and second electrical connections C1, C2.

The temperature sensor 23 or heat sensor is preferably in the form of a thermistor 23. The thermistor 23 is provided in the base part 11. The thermistor 23 extends through the additional aperture 74. The thermistor 23 is therefore arranged in-between the first electrical connection and the second electrical connection C1, C2. Preferably, the thermistor 23 extends vertically in the base part 11. Preferably, the thermistor 23 is movable in the additional aperture 74. Preferably, the thermistor 23 is slideable vertically through the additional aperture 74. Preferably, the thermistor 23 is movable along a vertical direction D relative to the heating plate 22. The thermistor 23 advantageously exhibits a negative temperature coefficient (NTC) behaviour.

Advantageously, a cap 75 is provided at an upper end 78 of the thermistor 23. The cap 75 encapsulates the upper end 78 of the thermistor 23. The cap 75 is fixed to the thermistor 23. The cap 75 comprises a flat top part 76. The upper end 78 of the thermistor 23 is in contact with the flat top part 76. Preferably, the cap 75 is cylindrical-shaped. Advantageously, the cap 75 has a diameter in the range [5 mm; 20 mm]. The cap 75 is preferably made of a high temperature resistant material. The cap 75 therefore withstands high temperatures and does not deteriorate when the heating assembly 12 operates. The cap 75 is preferably made of a high thermal conductive material to ensure that heat from the heated bottom plate 15 is effectively transferred to the thermistor 23. The cap 75 is preferably made of a low electrically conductive material. For example, the cap 75 is made of a ceramic material.

Advantageously, the heating plate 22 and the cap 75 are dimensioned so that an air-gap 79 is created between the heating plate 22 and the cap 75. To provide the air-gap 79, a guiding member 80 is preferably arranged within the additional aperture 74 to maintain the capped thermistor 23 spaced apart from the heating plate 22. The guiding member 80 is advantageously fixed to the heating plate 22 and receives the capped thermistor 23 in the additional aperture 74. The air-gap 79 is in the form of a generally annular hollow volume extending between the heating plate 22 and the capped thermistor 23. Preferably, the air-gap 79 has a width of at least 1 millimeter. The air-gap 79 ensures that heat conduction from the heating element 71 directly to the thermistor 23 is limited. As such, the air-gap 79 acts as a thermal insulator between the heating element 71 and the thermistor 23. Therefore, the air-gap 79 ensures that the heat coming from the bottom plate 15 towards the thermistor 23 is predominant over the heat coming from the heating element 71, and that the thermistor 23 is therefore responsive to the heat coming from the bottom plate 15 rather than to the heat coming from the heating element 71. This allows the thermistor 23 to properly detect the temperature in the jar 24 without being disrupted by the heat coming from the heating element 71.

Figure 8A:
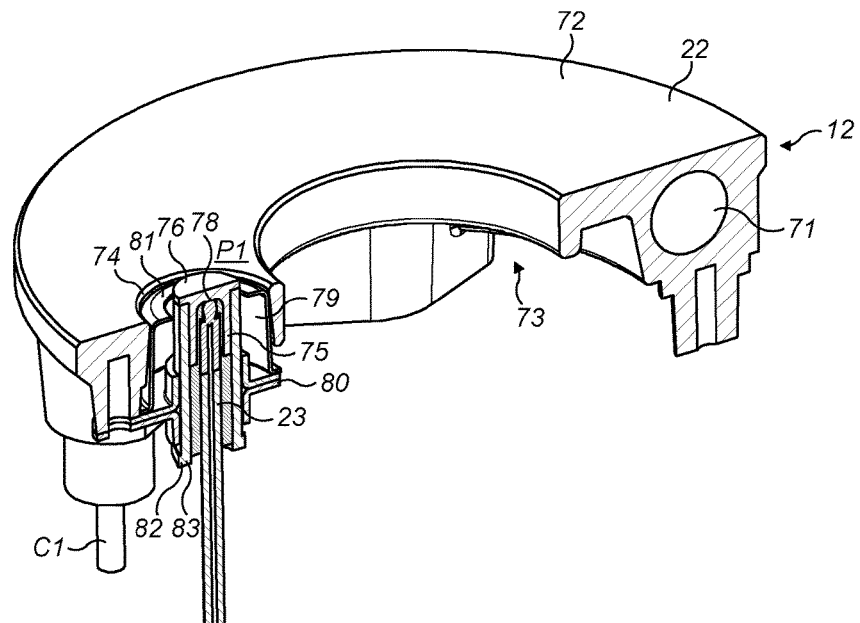
Figure 8B:
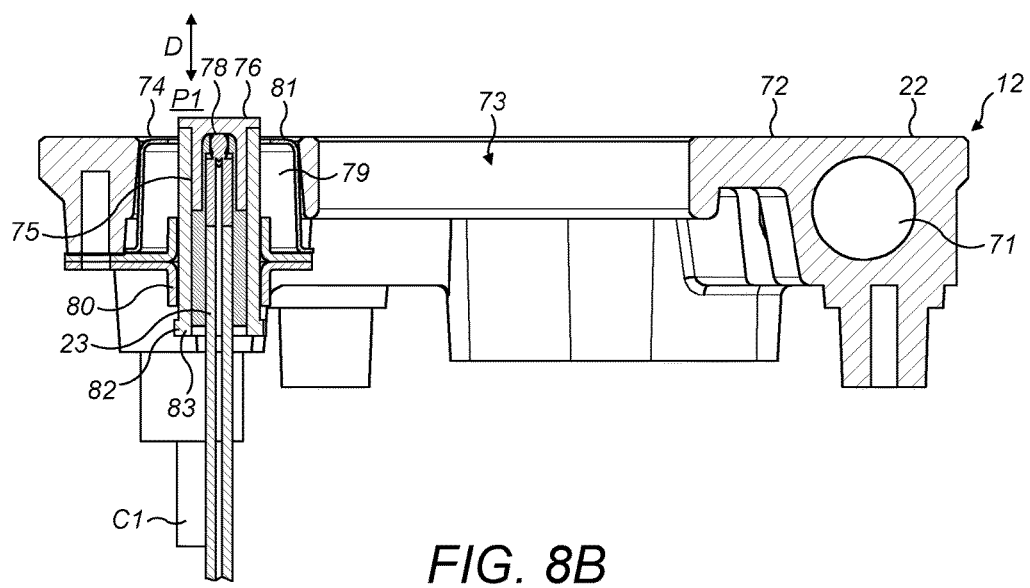
Figure 9A:
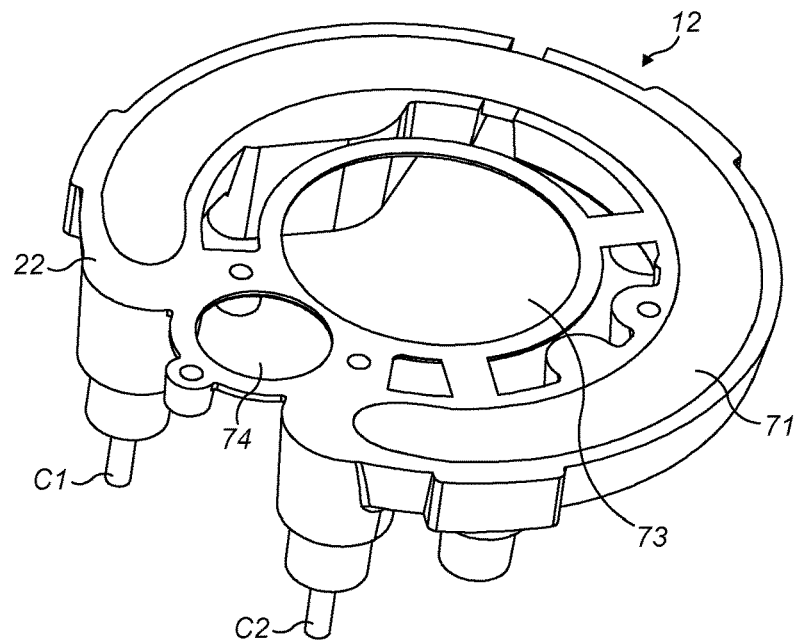
Figure 9B:
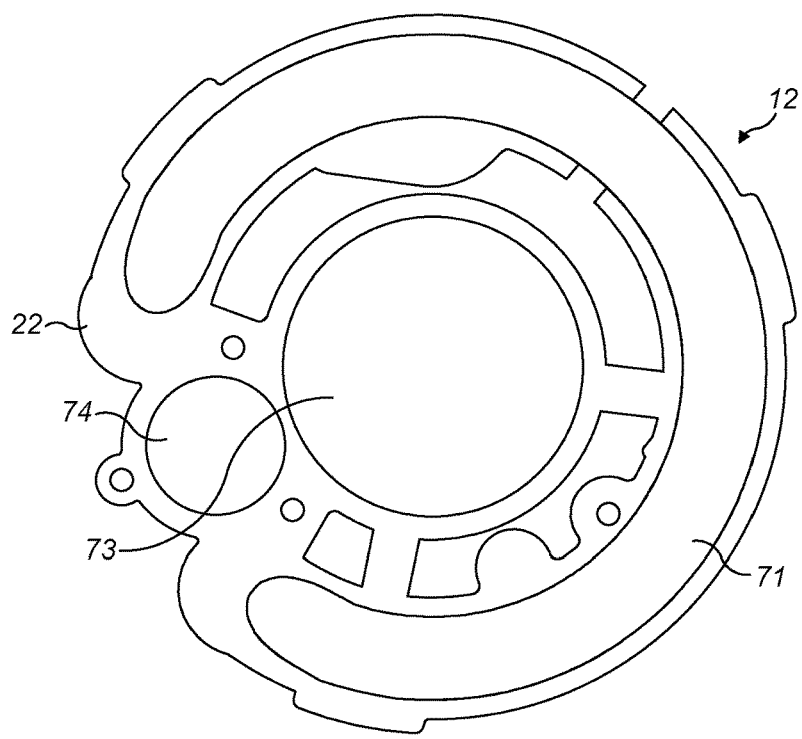

Optionally, an insulating member 81 is provided in the air-gap 79 for further limiting heat conduction from the heating element 71 directly to the thermistor 23. As shown in FIG. 8A, the insulating member 81 is for example in the form of an insulating sleeve 81 arranged along the circumference of the additional aperture 74. The insulating sleeve 81 is spaced apart from the capped thermistor 23. The insulating sleeve 81 surrounds the capped thermistor 23.

The capped thermistor 23 is adapted to move between a first position P1 and a second position P2. In the first position P1 shown in FIG. 8A and FIG. 8B, the top part 76 is proud of the external heating surface 72. In other words, when the cap 75 moves towards the first position P1, the top part 76 comes out by a given distance from the external heating surface. The given distance is advantageously in the range [1 mm; 10 mm], for example 2 millimeters. The cap 75 is adapted to take the first position P1 when the bottom part 14 does not contact the heating plate 22. In the second position P2 shown in FIG. 7B, the top part 76 is aligned or flush with the external heating surface 72. The cap 75 is adapted to move towards the second position P2 when the bottom part 14 contacts with the heating plate 22. A spring mechanism 77 may be provided in the base part 11 to provide the thermistor 23 with a vertical retention force so that the thermistor 23 is biased upwards, towards the first position P1. The capped thermistor 23 is positioned in the heating assembly 12 so that when the jar assembly 13 is placed on the base part 11, the bottom plate 15 touches and depresses the capped thermistor 23, urging the capped thermistor 23 from the first position P1 towards the second position P2.

The guiding member 80 guides the cap 75 vertically when the cap 75 moves through the additional aperture 74 between the first position P1 and the second position P2. Optionally, a stop member 82 is provided at a lower end 83 of the cap 75 to prevent the cap 75 from moving beyond the given distance.

Advantageously, the encapsulated thermistor 23 touches the bottom plate 15 whilst the jar assembly 13 is in place on the base part 11 so that the thermistor 23 can measure the temperature of the bottom plate 15 and therefore provide the user with a temperature feedback of the food ingredients in the jar 24. The position of the thermistor 23 in the heating assembly 12 is such that an accurate sensing of the temperature of the bottom part 14 is enabled. The blender 10 therefore allows for an effective cooking of the ingredients and helps preventing from undercooking, overcooking, overflowing or dry-boiling.

Although in the above described embodiments the blender 10 has been described as being a cooking blender, the present invention can be applied to any other kitchen appliance having a heating plate 22 and a central drive system, such as a food processor or a mixer grinder.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In particular, although the invention has been described based on a kitchen appliance, it can be applied to any industrial blender, either to blend food ingredients or non-edible materials. In the claims, the word "comprising" does not exclude other elements or steps, and the indefinite article "a" or "an" does not exclude a plurality. Any reference signs in the claims should not be construed as limiting the scope.

The invention claimed is:

1. A blender for blending ingredients, said blender comprising:
   a base part including a motor therein, said base part comprising:
      a heating plate comprising:
         a heating element extending along a portion of a circumference of the heating plate;
         a first contact connected to a first end of the heating element; and
         a second contact connected to a second end of the heating element;
      a first opening substantially centered within the heating plate and a second opening positioned between the first end and the second end of the heating element and offset from the first opening; and
      a temperature sensor extending through said second opening; and
   a container, detachable from said base part, said container comprising
      a first container opening configured to receive said ingredients; and a
      bottom part, including a rotatable blade assembly extending through the bottom part configured to engage said motor, said bottom part configured to: contact the heating plate; and the temperature sensor.

2. The blender as claimed in claim 1, wherein said temperature sensor comprises a thermistor.

3. The blender as claimed in claim 2, wherein said thermistor is a Negative Temperature Coefficient thermistor.

4. The blender as claimed in claim 2, wherein said temperature sensor comprises a cap encapsulating said thermistor.

5. The blender as claimed in claim 4, wherein said cap is made of a high temperature resistant material.

6. The blender as claimed in claim 4, wherein said cap is cylindrical-shaped.

7. The blender as claimed in claim 4, wherein said heating plate comprises an aperture for receiving said cap.

8. The blender as claimed in claim 4, wherein said second opening and said cap are dimensioned to create an air gap in-between.

9. The blender as claimed in claim 4, wherein said cap is movable along a vertical direction (D) relative to the heating plate, said cap being configured to take a first position (P1) when said bottom part does not contact said heating plate, and a second position (P2) when said bottom part contacts said heating plate.

10. The blender as claimed in claim 9, wherein said given distance is in the range 1 mm to 10 mm.

11. The blender as claimed in claim 9, wherein said cap is biased toward said first position (P1).

12. The blender as claimed in claim 9, wherein said thermistor is in contact with said flat top part.

13. The blender as claimed in claim 9, wherein said cap comprising a flat top part, said flat top part coming out by a given distance from an external surface of said heating plate in said first position (P1), said flat top part being aligned with said external surface in said second position (P2).

* * * * *